INVENTOR
LEONARD CORDONE
GERHARDT A. DOBSLAW
ROBERT J. OKONIEWSKI

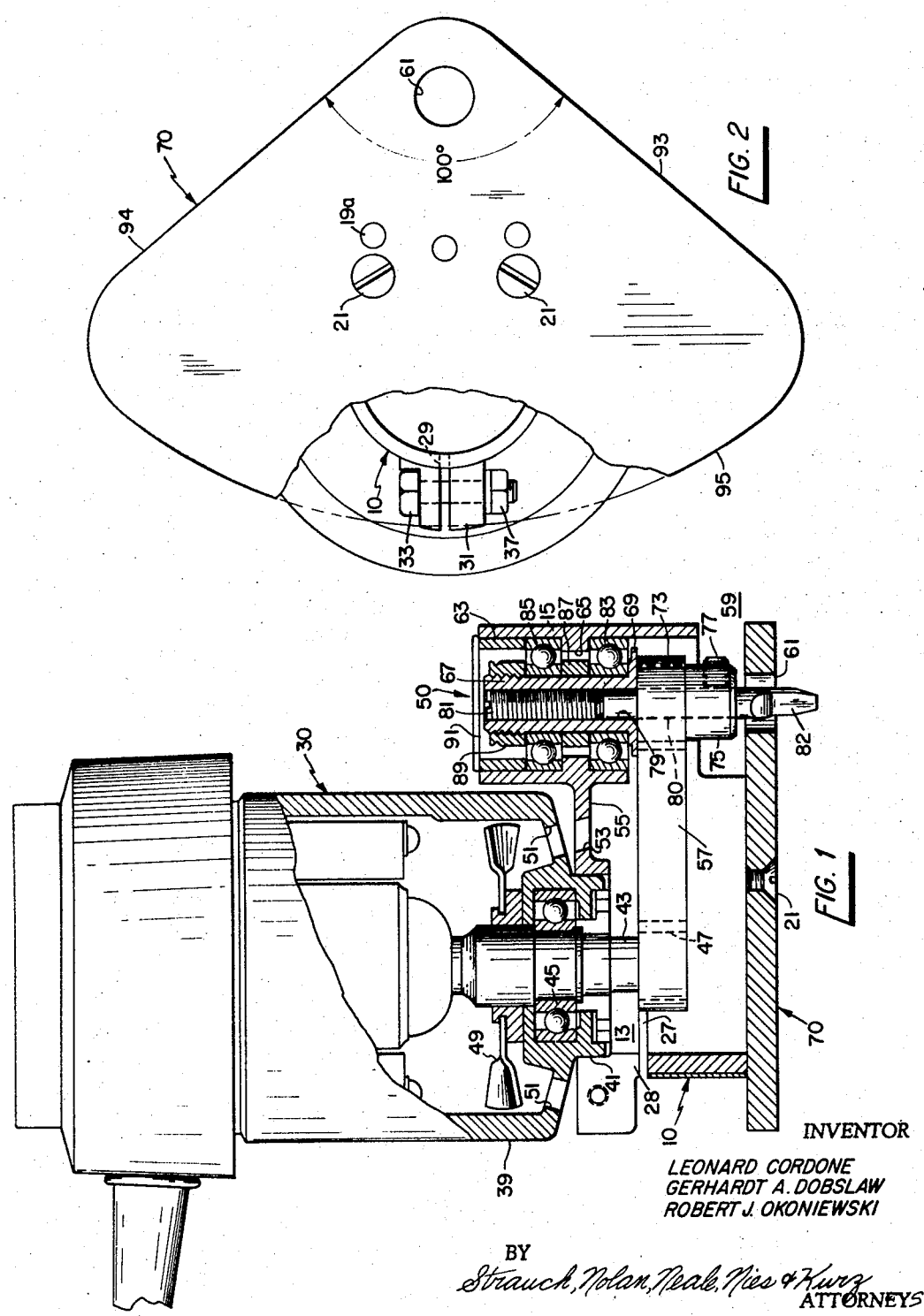

BY
ATTORNEYS

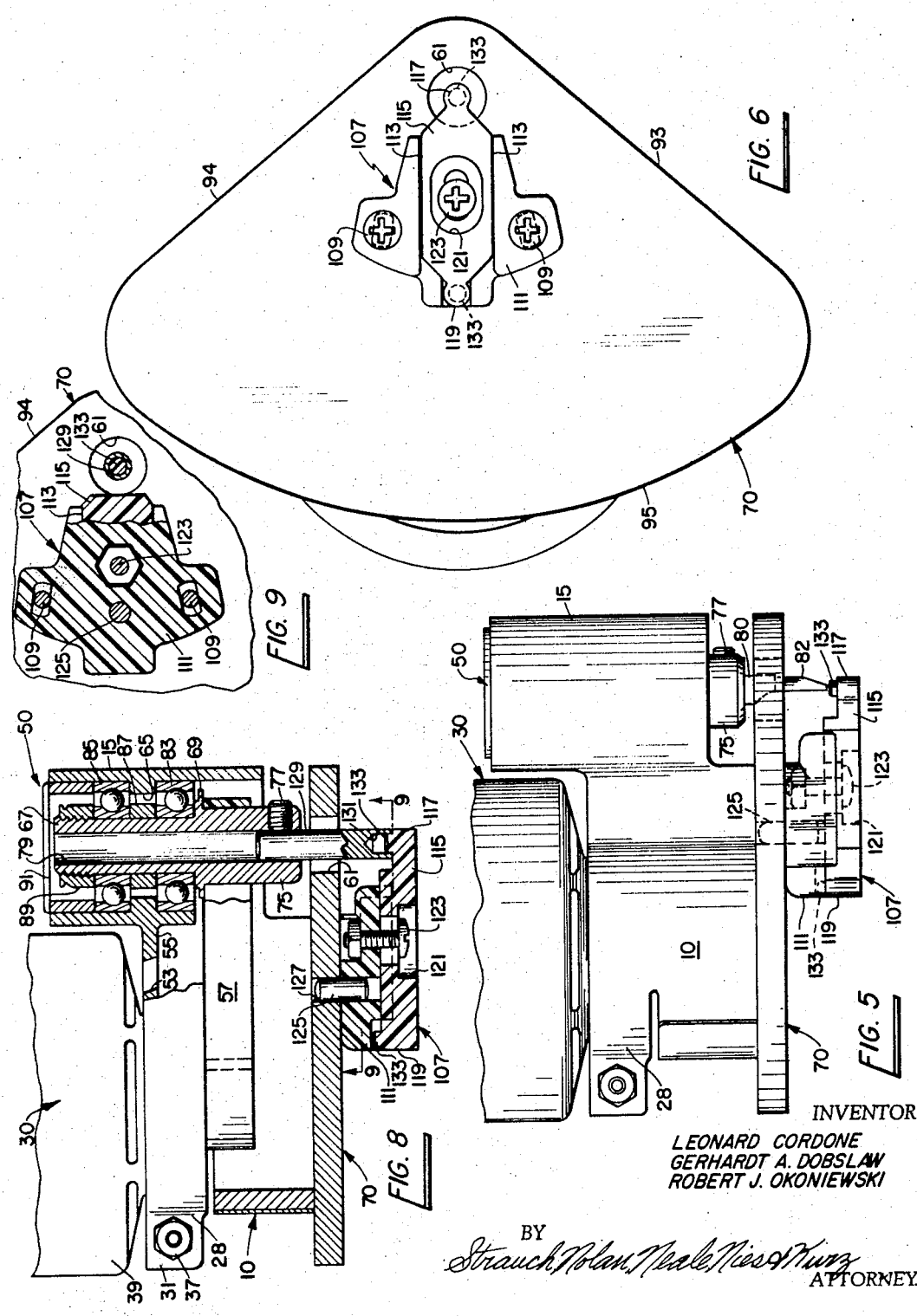

United States Patent Office 3,454,061
Patented July 8, 1969

3,454,061
POWER TOOL
Leonard Cordone, East Syracuse, Gerhardt A. Dobslaw, Fayetteville, and Robert J. Okoniewski, Syracuse, N.Y., assignors to Rockwell Manufacturing Company, Pittsburgh, Pa., a corporation of Pennsylvania
Filed Dec. 22, 1966, Ser. No. 604,021
Int. Cl. B27c 5/10; B23c 1/20
U.S. Cl. 144—134                                     7 Claims

ABSTRACT OF THE DISCLOSURE

An electrically driven router and laminate trimmer having a base which supports a cutter and guides it relative to the workpiece. A motor mounted on the base is drive-connected to a rotatable spindle, also mounted on the base, and offset from the motor axis, to which the cutter is attached. Preferably, mechanism is provided for adjusting the depth of cut; and, for trimming laminates, a guide is fixed to the bottom of the base. The guide can be adjusted so that the cutter will trim the laminate flush with the edge of a member contacted by the guide.

Background and summary of the invention

This invention pertains to a power operated hand tool and particularly to the class of tools known as routers or laminate trimmers.

More specifically it pertains to improved, electrically driven, off-set laminate trimmers and trimmer base units of unique design in which the cutter rotation axis is off-set substantially from motor axis and preferably in which the cutter is located at one side of the motor. This makes the tool particularly useful on narrow ledges arranged at right angles to one another such as the splash board at the back of the work surfaces on kitchen bases. The off-set feature of this invention contributes towards closer penetration of the cutting tool into the corners of structures to be trimmed, while the novel base design facilitates maintaining the tool in the desired plane of operation in transition from one right angle surface to another. Additionally this off-set arrangement of the cutter relative to the motor permits the full weight of the motor to be supported on the surface of the work when one is routing or trimming the edge of a large workpiece rather than only half supported as in prior art routers and laminate trimmers.

Prior art hand routers and trimmers, as represented by such United States Patents as Turner et al., No. 2,842,173 of July 8, 1958, for "Routers with Detachable Motors and Switch Handles," and De Man, No. 2,960,126 of Nov. 15, 1960, for "Power Operated Cutting Tool," utilize essentially circular bases having tool openings therein, and motors with directly driven tools mounted centrally above the bases. With these prior art arrangements, the circular dimensions of the base and of the motor structure limit access of the tool against upstanding surfaces and particularly into corners thereof and inherently provide poor support for the weight of the motor with resultant marring of the workpiece.

It is the principal object of this invention to provide an improved router or trimmer which remedies the above shortcomings of the prior art.

It is a further object of this invention to provide an improved hand power trimmer having a substantially equilateral triangular base configuration, with the cutting tool being mounted close to the apex of the triangle, and the sides of the triangle at said apex forming an angle of approximately 100°, to provide for better tool to work access and guidance, respectively.

A further object of this invention is to provide an improved, compact bearing structure for the tool spindle.

Another object is to provide an improved mounting and tool height adjusting structure associated with the tool spindle.

Still another, and further object of this invention is to provide improved air cooling for the drive transmitting means for said tool spindle.

The invention will become more fully apparent from the claims and the description as it proceeds in connection with the drawings.

Brief description of the drawing

In the drawing:

FIGURE 1 is a partially sectioned elevational view of the invention adapted for use as a router;

FIGURE 2 is a bottom view of the structure of FIGURE 1 with the base plate partly cut away;

FIGURE 5 is a fragmentary elevational view of the invention shown in greater detail in FIGURE 1 equipped with guide means adapting the tool for use as a laminate trimmer;

FIGURE 6 is a bottom view thereof;

FIGURE 8 is a fragmentary sectional view illustrating the alignment of the cutter guide with the cutter rotation axis; and FIGURE 9 is a fragmentary sectional view taken substantially along line 9—9 of FIGURE 8.

Detailed description of a preferred embodiment

Figure 4:
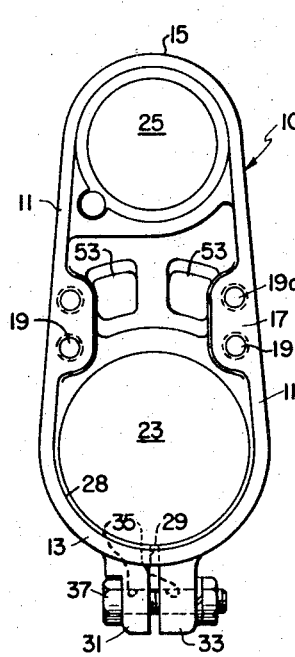
FIGURE 4 is a detail of the housing construction, viewed from the bottom.
Figure 3:
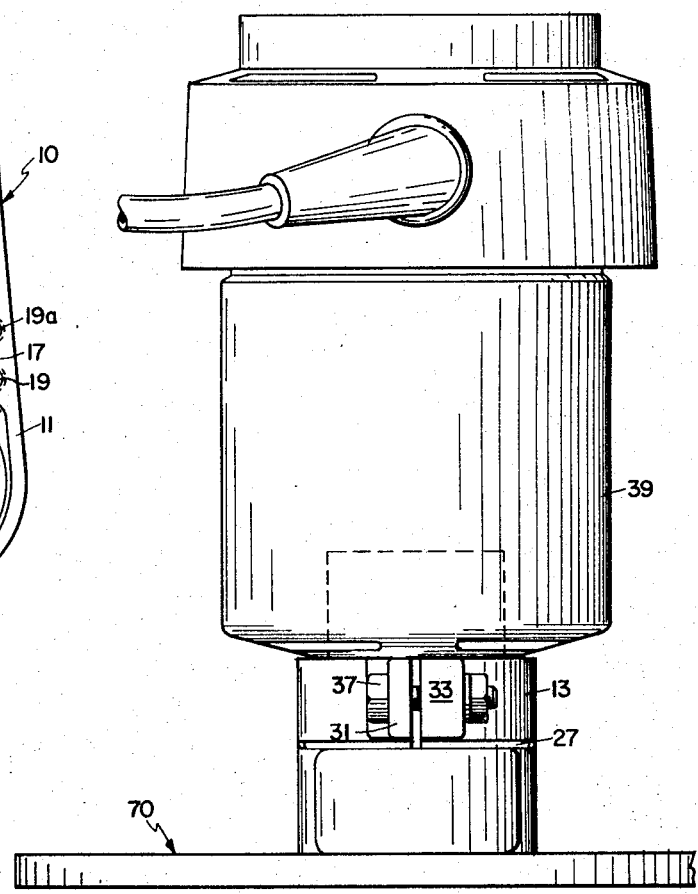
FIGURE 3 is a side view of the structure of FIGURE 1 looking from the left.

The power hand tool of this invention comprises a housing 10 (FIGURES 1 and 4) which serves as a unifying support for an electric motor 30, a tool spindle assembly 50, and a base 70. As best seen in FIGURE 4, housing 10 is a substantially oval shaped casting of aluminum alloy having sidewalls 11 and rounded end walls 13 and 15. Sidewalls 11 have integral web portions 17 along the bottom of the casing, which are drilled and tapped at 19 to provide for mounting of base 70 on the bottom of said housing by countersunk screws 21, FIGURE 2. Additional tapped holes 19a are provided in base 70 for attachment of tool guides or other accessories.

The housing casting 10 is formed with two interior, circular seats, a larger one 23, for receiving motor 30, and a smaller one 25 for mounting a tool spindle. As will be seen in FIGURE 1 the housing is cut at 27 parallel to the base thereof and approximately half way into seat 23 to form a clamping ring 28 for the vertically mounted motor 30. The ring 28 is, in turn, split vertically at 29, and has ears 31 and 33 cast integral therewith. The ears have holes 35 drilled through them which receive clamping bolt and nut 37. By this construction, the motor 30 is detachably clamped to the casting 10.

The motor 30 is encased in a cylindrical case 39, having a reduced shoulder 41 which fits into opening 23 of the case and which is clamped within the clamping ring 28 by tightening bolt and nut assembly 37. As will be seen in FIGURE 1, the motor has a drive shaft 43, rotatable in bearing 45 mounted in the motor case 39, which shaft extends well into the housing 10 and carries a drive pulley 47. Also mounted on motor shaft 43 but within motor case 39 is a fan 49, which induces air flow into the top of the motor case 39 through inlet ports (not shown), around the armature and field of motor 30 and out through exhaust apertures 51 at the bottom of the case 39. At least some of the apertures 51 in motor case 39 are aligned with apertures 53 in top wall 55 of housing 10, so that at least some of the exhaust air from motor 30 will enter the interior of the housing 10 where it will serve to cool drive belt 57 and other parts of the drive train within said housing 10, and from whence it will exhaust ultimately about the tool spindle through openings 59 and 61 at the bottom and tool end of the housing 10 and in the base plate 70, respectively. The exhausting air will serve to blow away cutting chips.

The tool spindle assembly 50 is mounted within seat 25 of housing 10 as follows: the seat is cylindrical, as seen at 63 (FIGURE 1) and has a ring 65 integral with the interior wall thereof about two thirds from the top. Spindle 67 constitutes an elongated, hollow member having an integral collar 69 slightly more than midway of its length, and a toothed portion of larger diameter than the rest of the spindle which serves as a pulley portion 73, cooperating with toothed belt 57. A continuation of this enlarged diameter portion constitutes a chuck 75. A set screw 77 is provided in chuck 75 to clamp the shank of a tool or cutter 82 inserted into bore 79 of spindle 67.

Two ball bearings 83 and 85 are utilized to rotatably support spindle 67. One of said ball bearings, 85 has its outer race seated above ring 65, while the other 83, has its outer race seated below said ring. The inner race of bearing 83 rests on collar 69 integral with the spindle; immediately above said race, and engaging therewith is a spacer collar 87 of a slightly greater axial height than ring 65 of cylinder 63. Next above the spacer collar 87 follows the inner race of ball bearing 85. The top end of the spindle 67 is externally threaded to receive clamping nut 89, which serves to compress the inner races of the two ball bearings and ring 87 against shoulder 69 of the spindle for rotation as an integral assembly. When assembled as above the outer races of bearings 83 and 85 will be retained against longitudinal displacement in cylindrical seat 63 by shoulders of ring 65, and will serve to prevent longitudinal movement of spindle 67 through their engagement with the balls and interior races which latter are on the spindle.

It has been pointed out above that spindle 67 is hollow throughout its length. The upper portion of the bore 79 through the spindle is threaded to receive an elongated set screw 81 which may be adjusted up and down the spindle to control the depth to which the shank 80 of cutter 82 may be inserted through the opposite, chuck end thereof. This provides for accurate depth of cut adjustment and ready interchangeability of cutters. A cap 91, normally covering cylindrical seat 25, is removed to gain access to set screw 81 from the top of the housing.

As previously mentioned, base plate 70 is attached to housing 10 by countersunk screws 21. The plate has two straight edges 93 and 94 of equal length forming an angle of slightly in excess of 90° and preferably approximately 100°, and a third, curved side 95. The cutter opening 61 lies in proximity of the 100° angle corner of the base plate 70, the corner being rounded on a radius about the center of opening 61 to provide smoother access of the cutter towards abutting vertical surfaces. The two other corners of the base plate are also suitably rounded as seen in FIGURE 2.

The tool described so far is usable as a router, with its base 70 resting flat on a surface which is to be grooved or cut away by cutter 82 in accordance with a preselected pattern. To adapt this same tool for use as a laminate trimmer, where it is desired to smooth out, or cut away material overlapping a vertical surface, a guide shoe assembly 107 is attached to base plate 70 by set screws 109 extending through arcuately elongated slots as shown in FIGURES 5, 6 and 9. The guide shoe assembly comprises a guide block 111, having parallel spaced guide walls 113 adapted to receive guide block 115, which latter is equipped with two substantially circular guide tips 117 and 119 of different diameters and has an oval adjustment recess 121 therein. Depending on the diameter of the cutter used, block 115 is placed within the guide walls 113 with either tip 117 or 119 in concentric alignment with cutter 82, as seen in FIGURE 5, and is fastened in place by bolt assembly 123. Block 111 has a pivot pin 125 fixed thereto and pivotally projecting into an aperture 127 in the base 70. When screws 109 are loose, assembly 107 can be pivoted about the axis of pin 125. When screw 123 is loose, guide block 115 can slide rectilinearly between guide walls 113. In fastening guide shoe assembly 107 to base plate 70, cap 91 is removed, as is set screw 81 (FIGURE 1) and cutter 82. A locating pin 129 furnished with guide shoe assembly 107 is inserted in the hollow bore 79, and the coaxially cylindrically recessed end of this pin is used to properly locate guide blocks 111 and 115 by engagement of its recess 131 with the complementary boss 133 formed integral with guide block 115 coaxial with tips 117 and 119 respectively. Once these guide blocks 111 and 115 have been shifted to their proper position and locked by tightening screws 109 and 123, the locating pin 129 is removed through the top of bore 79 and cutter 82 is inserted in the same way. This eliminates the necessity of moving guide shoe assembly 107 to replace the locating pin with the cutter, which would negate any positioning effort and assures that the arcuate guide surface 117 or 119 is accurately coaxially aligned with the cutter rotation axis.

Figure 7:
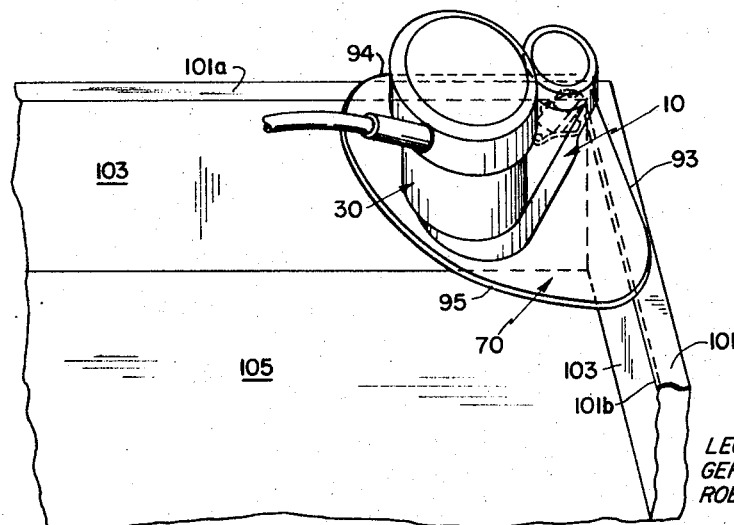
FIGURE 7 is a perspective view illustrating a uniquely advantageous use of the off-set laminate trimmer.

One particular utilization of the present invention for trimming laminate material overhanging vertical surfaces is illustrated in FIGURE 7. In this figure the trimmer is used to cut away the edge of the laminate designated 101b extending from the top horizontal surfaces 101 and 101a of splash board 103 on sinkboard installation 105. The problem is to trim edge 101b smooth with vertical wall 103 without cutting into or gouging said wall.

For this operation the trimmer is assembled with cutter 82 and guide 117 as shown in FIGURE 5. Referring to FIGURE 7, and assuming that trimming proceeds from left to right in said figure (the tool will operate equally well going in either direction) base 70 is placed with its edge 94 on ledge 101a to control the height and horizontal alignment of the trimmer, with cutter guide 117 abutting against vertical wall 103 so as to control the depth of cut into laminate 101b. Since the effective cutting periphery of cutter 82 is of the same diameter as the guiding surface of guide tip 117, it is obvious that laminate 101b of the laminate will be trimmed flush with wall 103 when the motor is started and the tool moved along ledge 101a. As the trimmer is moved to the right and approaches the corner of the splash board (position shown in FIGURE 7), the right hand edge 93 of base plate 70 will reach ledge 101 before its left hand edge 94 leaves ledge 101a and will take over the horizontal guidance of the tool as cutting continues along ledge 101. While the trimmer is moved, first along ledge 101a and then along ledge 101, the depth of cut is controlled by arcuate guide tip 117, as previously explained.

It will be understood that in the illustration of FIGURE 7, where cutting is assumed to proceed from left to right laminate edge 101b has been removed along ledge 101a, while that along ledge 101 is yet to be cut away. Also it will be appreciated that the obtuse angle formed by edges 93 and 94 of base 70 is particularly advantageous in trimming past a corner by improving tool stability and alignment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A power driven router or the like comprising:
   (a) a base having a planar bottom surface portion for contracting a workpiece and guiding a cutter relative thereto and having a nose defined by a pair of converging straight edges, the included angle between said converging edges at said nose being approximately 100 degrees;
   (b) a motor attached to said base at a position remote from said nose with its axis substantially perpendicular to said planar bottom surface portion;
   (c) a rotatable, cutter-supporting spindle mounted on said base above the top surface thereof and at said nose in substantially equidistantly spaced relation to said pair of edges and with its rotation axis normal to said bottom surface; and
   (d) a drive connection for transmitting power from said motor to said spindle;
   (e) said base having a cutter opening therethrough in alignment with and beneath said spindle whereby a cutter may be inserted through said base opening and drive-connected to said spindle.

2. The router of claim 1 wherein said converging straight edges are interconnected by an arcuate edge concentric with the spindle rotation axis.

3. A power driven router, or the like comprising:
   (a) a base having a planar bottom surface for contacting the work and guiding a cutter relative thereto and having a nose defined by converging edges;
   (b) a motor attached to said base in a position remote from said nose with its axis substantially perpendicular to said bottom surface;
   (c) a rotatable cutter supporting spindle mounted on said base above the top surface thereof and at said nose and with its rotation axis normal to said bottom surface; and
   (d) a drive connection for transmitting power from said motor to said spindle;
   (e) said base having a cutter opening therethrough in alignment with and beneath said spindle whereby a cutter may be inserted through said base opening and drive connected to said spindle;
   (f) a housing mounted on the top of said base forming a substantially continuous enclosure about said power transmitting driving connection, said motor and said spindle being mounted on said housing; and
   (g) said motor being equipped with a circulating air fan exhausting into the housing to provide an air stream for cooling of said power transmitting driving connection.

4. A power driven router according to claim 3, wherein said housing has an air exhaust port adjacent said spindle and opening toward said nose thereby permitting escape of air out of the housing in proximity of the tool spindle and base opening and thereby serving to cool said spindle and to blow cutting chips in the direction of said nose away from said motor.

5. The power driven router defined in claim 1, further comprising clamping means at the lower end of said spindle engageable with said cutter to fix said cutter relative to said spindle.

6. The power driven router defined in claim 5, wherein said spindle has a bore therethrough and further comprising thrust bearing means removably mounted in the bore of said spindle at the end thereof remote from said base plate and selectively axially adjustable therein to engage and establish the position of the upper end of a cutter mounted in said spindle.

7. A base unit usable with an electric motor to provide a router or similar electrically powered tool comprising:
   (a) a housing;
   (b) a base fixed to said housing having a planar bottom surface portion for contacting a workpiece and guiding a cutter relative thereto, said base further having a nose defined by a pair of converging edge portions of said base;
   (c) a rotatable, cutter-supporting spindle mounted in said housing above said base at the nose of the base with its axis of rotation normal to the planar bottom surface portion of the base, said base having an opening therethrough in alignment with said spindle through which a cutter drive-connected to said spindle can extend; and
   (d) means associated with said housing at a location remote from the nose of said base for fixing an electric motor to said housing, whereby said spindle may be driven by said motor, said housing having an air exhaust port adjacent said spindle and opening toward said nose to permit air to escape out of the housing in proximity of the tool spindle and base opening and cool said spindle and blow cutting chips in the direction of said nose away from the location at which the tool motor is adapted to be mounted.

References Cited

UNITED STATES PATENTS

| | | | |
|---|---|---|---|
| 2,610,658 | 9/1952 | Koeling | 144—136.3 X |
| 3,123,112 | 3/1964 | Hodges et al. | 144—134 X |
| 3,346,026 | 10/1967 | Pluchino | 144—144 |

DONALD R. SCHRAN, *Primary Examiner.*

U.S. Cl. X.R.

90—12